(12) United States Patent
Iwata et al.

(10) Patent No.: US 10,466,685 B2
(45) Date of Patent: Nov. 5, 2019

(54) PRODUCTION MANAGEMENT METHOD OF SUBSTRATE IN COMPONENT MOUNTING SYSTEM

(71) Applicant: Panasonic Intellectual Property Management Co., Ltd., Osaka (JP)

(72) Inventors: Isato Iwata, Aichi (JP); Takuya Yamazaki, Yamanashi (JP); Hirokazu Takehara, Yamanashi (JP); Hiroki Sagara, Yamanashi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 565 days.

(21) Appl. No.: 14/845,618

(22) Filed: Sep. 4, 2015

(65) Prior Publication Data
US 2016/0116898 A1   Apr. 28, 2016

(30) Foreign Application Priority Data

Oct. 23, 2014   (JP) .................................. 2014-216034

(51) Int. Cl.
*G05B 19/418* (2006.01)
(52) U.S. Cl.
CPC .................. *G05B 19/41865* (2013.01); *G05B 2219/32208* (2013.01); *G05B 2219/32336* (2013.01); *G05B 2219/45029* (2013.01)
(58) Field of Classification Search
CPC .......................... G05B 19/401; G05B 19/4155
USPC ...................... 700/117; 348/207, 14; 370/264
See application file for complete search history.

(56) References Cited

U.S. PATENT DOCUMENTS

| | | | | |
|---|---|---|---|---|
| 4,805,110 A * | 2/1989 | Takahashi | .............. | H05K 13/04 29/703 |
| 6,651,235 B2 * | 11/2003 | Dai | ..................... | G06F 17/5045 257/401 |
| 6,782,520 B1 * | 8/2004 | Igusa | ................... | G06F 17/5072 716/114 |
| 7,225,116 B2 * | 5/2007 | Harn | ................... | G06F 17/5072 700/97 |
| 7,614,141 B2 * | 11/2009 | Douriet | ............. | H01L 23/49827 257/774 |

(Continued)

FOREIGN PATENT DOCUMENTS

| | | |
|---|---|---|
| CN | 101415321 A | 4/2009 |
| JP | 2004-128400 A | 4/2004 |

(Continued)

OTHER PUBLICATIONS

English Translation of Chinese Search Report dated Feb. 19, 2019 for the related Chinese Patent Application No. 201510688186.9.

*Primary Examiner* — Bo Fan
(74) *Attorney, Agent, or Firm* — Pearne & Gordon LLP

(57) ABSTRACT

In a production management method of a substrate in a component mounting system having plural component mounting lines configured to include plural component mounting apparatuses, reading production data of an interrupt type substrate; collecting equipment data of each of the component mounting lines; and determining at least one component mounting line to produce the interrupt type substrate based on the read production data of the interrupt type substrate and the collected equipment data of each of the component mounting lines are performed.

15 Claims, 8 Drawing Sheets

(56) References Cited

U.S. PATENT DOCUMENTS

| | | | | |
|---|---|---|---|---|
| 8,224,487 B2* | 7/2012 | Yoo | ................ | G05D 1/0225 |
| | | | | 700/259 |
| 8,516,428 B2* | 8/2013 | Bowers | ................ | G06F 17/505 |
| | | | | 716/111 |
| 9,165,095 B2* | 10/2015 | Chih | ................ | G03F 7/70441 |
| 9,801,317 B2* | 10/2017 | Kurashina | ............. | H05K 13/08 |
| 2005/0254440 A1* | 11/2005 | Sorrell | ............. | H04L 29/06027 |
| | | | | 370/264 |
| 2010/0050426 A1 | 3/2010 | Shimizu et al. | | |
| 2015/0206086 A1* | 7/2015 | Kitayama | .......... | G05B 19/4188 |
| | | | | 705/7.26 |
| 2016/0050360 A1* | 2/2016 | Fisher | ................ | G03B 17/561 |
| | | | | 348/207.11 |
| 2016/0179300 A1* | 6/2016 | Ohashi | .................. | H05K 13/08 |
| | | | | 715/771 |
| 2017/0023931 A1* | 1/2017 | Sanji | ................. | G05B 19/4155 |

FOREIGN PATENT DOCUMENTS

| | | | | | |
|---|---|---|---|---|---|
| JP | 2009-099776 A | | 5/2009 | | |
| JP | WO 2014/033960 | * | 3/2014 | ........... | G05B 19/418 |
| JP | WO 2015/019492 | * | 2/2015 | ............ | H05K 13/04 |
| JP | WO 2015/079560 | * | 6/2015 | ............ | H05K 13/00 |

\* cited by examiner

FIG. 6A

| | TYPE OF MOUNTABLE COMPONENT |
|---|---|
| FIRST LINE | D, F |
| SECOND LINE | A, B, C, E |
| THIRD LINE | E, F |

FIG. 6B

| | TYPE OF MOUNTABLE COMPONENT |
|---|---|
| FIRST LINE | F |
| SECOND LINE | A, B, C, E |
| THIRD LINE | F |

PRODUCTION MANAGEMENT METHOD OF SUBSTRATE IN COMPONENT MOUNTING SYSTEM

CROSS-REFERENCES TO RELATED APPLICATION(S)

This application is based on and claims priority from Japanese Patent Application No. 2014-216034 filed on Oct. 23, 2014, the entire contents of which are incorporated herein by reference.

BACKGROUND

1. Field of the Invention

One or more embodiments of the present invention relate to a production management method of a substrate in a component mounting system configured to include plural component mounting apparatuses.

2. Description of Related Art

Facilities for producing component mounting substrates have component mounting lines in which plural component mounting apparatuses for, for example, mounting components are arranged, and produce the component mounting substrates in each component mounting line. Each of the component mounting lines produces substrates of a preset type, but may produce a substrate by interruption. In such a case, an operator stops production in a component mounting line which presently produces the substrates, and replaces equipment included in the component mounting line, and newly prepares a component mounting line for production of an interrupt type substrate (see Patent Reference 1, for instance).

Patent Reference 1 is JP-A-2004-128400.

SUMMARY

However, replacement of equipment furnished with the component mounting line for production of the interrupt type substrate may significantly decrease production efficiency of the substrates primarily produced by the component mounting line.

Hence, one of objects of the embodiments of the invention is to provide a production management method of a substrate in a component mounting system capable of producing an interrupt type substrate with the present state of equipment furnished with a component mounting line less changed.

A production management method of a substrate in a component mounting system of the embodiments is the production management method of the substrate in the component mounting system having plural component mounting lines, each configured to include plural component mounting apparatuses, the method includes reading production data of an interrupt type substrate; collecting equipment data of each of the component mounting lines; and determining at least one component mounting line to produce the interrupt type substrate based on the read production data of the interrupt type substrate and the collected equipment data of each of the component mounting lines.

According to the embodiments of the invention, the interrupt type substrate can be produced with the present state of equipment furnished with the component mounting line less changed.

BRIEF DESCRIPTION OF THE DRAWINGS

FIGS. 6A and 6B are diagrams illustrating types of components furnished with each of the component mounting lines of the component mounting system in the embodiment of the invention.

DETAILED DESCRIPTION

An embodiment of the invention will hereinafter be described with reference to the drawings. The following configurations, shapes, etc. are illustration for description, and changes can properly be made according to specifications of a component mounting system. Hereinafter, the overlap description is omitted by assigning the same numerals to corresponding elements in all the drawings.

Figure 1:
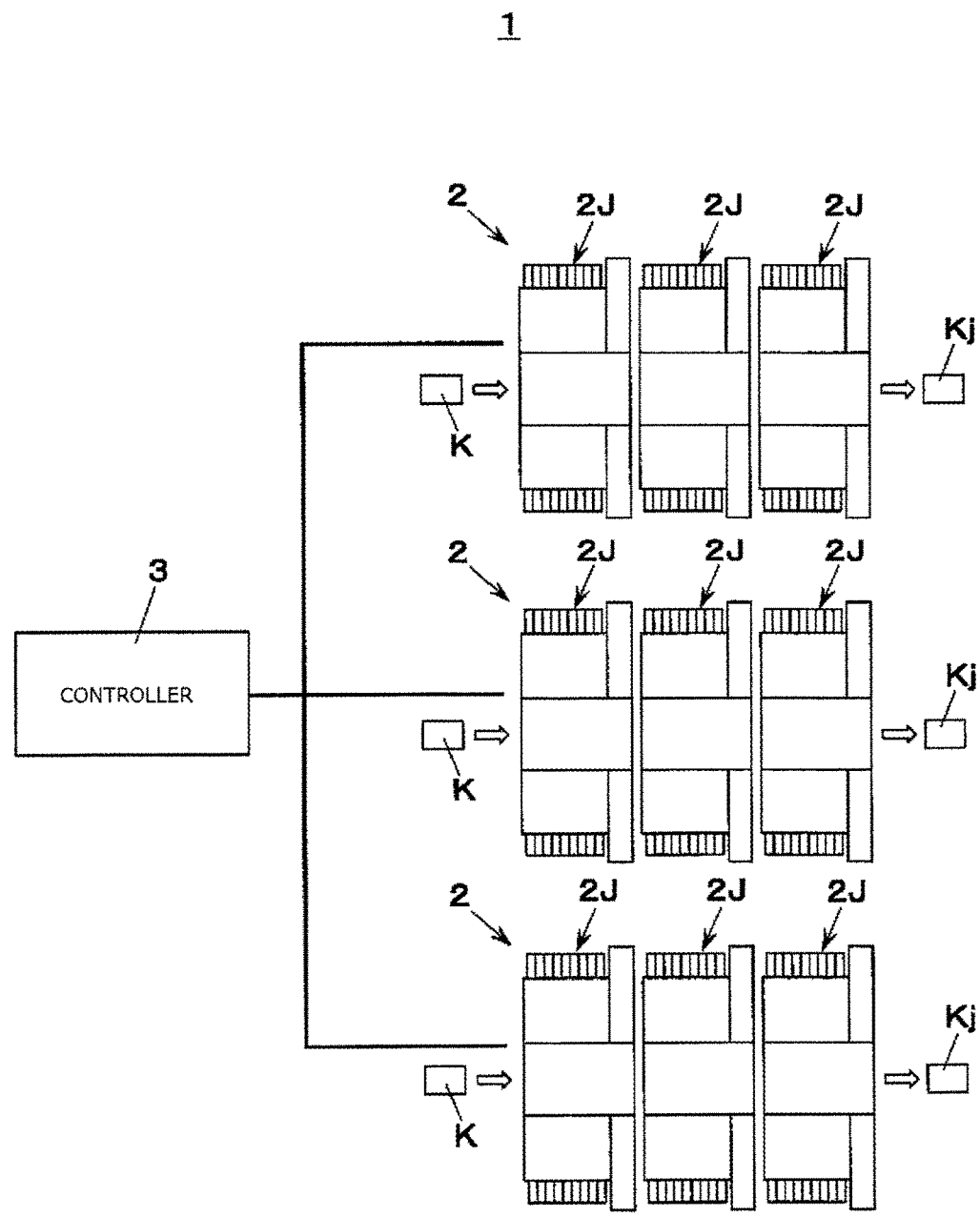
FIG. 1 is a schematic configuration diagram of a component mounting system in an embodiment of the invention.

FIG. 1 illustrates a component mounting system 1 of the embodiment. A solid line indicates a communication line, and the communication line may be wired or wireless as long as communication between a component mounting line 2 and a controller 3 can be conducted. The component mounting system 1 includes the plural component mounting lines 2 and the controller 3. Each of the component mounting lines 2 includes plural (three herein) component mounting apparatuses 2J joined in series. In addition, the component mounting lines 2 may be configured by at least one component mounting line 2. The component mounting line 2 may include an apparatus related to component mounting other than the component mounting apparatuses 2J. The controller 3 captures information necessary for production, and creates production data from the captured information, and collects production actual result data obtained from each of the component mounting lines 2 by production.

Figure 2:
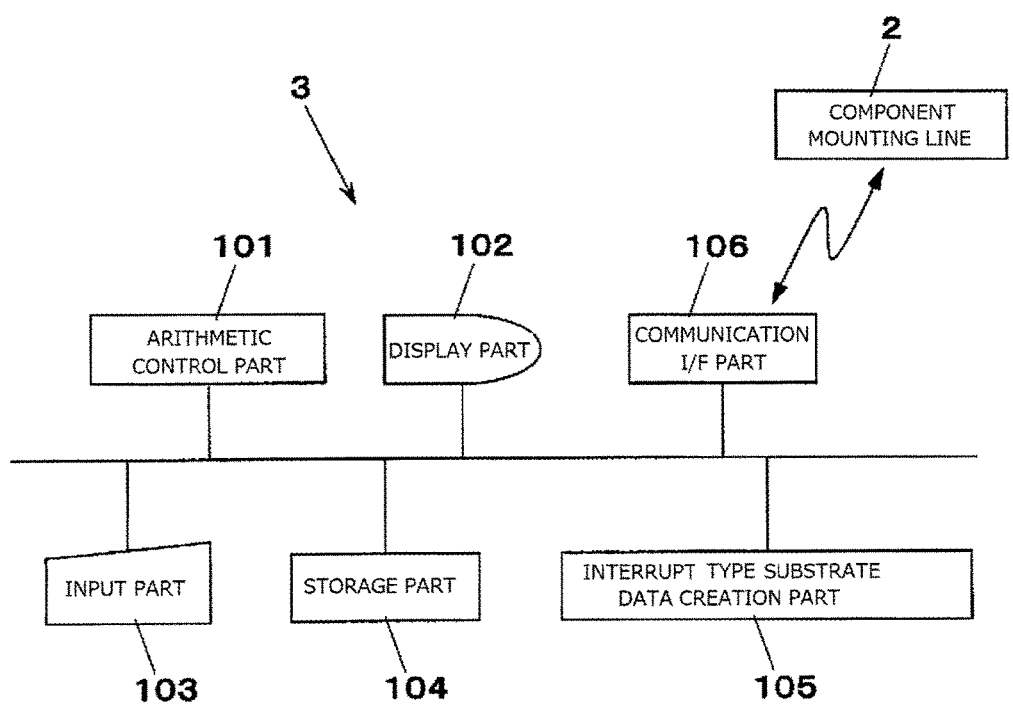
FIG. 2 is a block diagram illustrating a function configuration of a controller included in the component mounting system in the embodiment of the invention.

FIG. 2 is a block diagram illustrating a function configuration of the controller 3 according to the embodiment of the invention. The controller 3 is a computer for controlling the plural component mounting lines 2. A general-purpose computer system such as a personal computer executes a program to thereby implement the controller 3. The controller 3 may be configured as a host controller for supervising plural lower controllers by having the lower controllers respectively in the component mounting lines 2.

In FIG. 2, the controller 3 includes an arithmetic control part 101, a display part 102, an input part 103, a storage part 104, an interrupt type substrate data creation part 105, and a communication I/F (interface) part 106. The arithmetic control part 101 is a CPU (Central Processing Unit), a numerical processor, etc., and loads and executes a program necessary for the interrupt type substrate data creation part 105 or the storage part 104 according to instructions from an operator, and controls each component according to an execution result. The display part 102 is a CRT (Cathode-Ray Tube), an LCD (Liquid Crystal Display), etc.

In FIG. 2, the input part 103 is a keyboard, a mouse, etc., and is used for, for example, giving each of the component mounting lines 2 instructions under control of the arithmetic control part 101. The communication I/F part 106 is a LAN (Local Area Network) adapter etc., and is used for, for example, communication between the controller 3 and each of the component mounting lines 2. The storage part 104 is means for storing data etc. related to the component mounting apparatus 2J. In the storage part 104, production data and mounting data for each type, production data created by the interrupt type substrate data creation part 105, and priority item, etc. are stored. The interrupt type substrate data creation part 105 is means for creating production data of an interrupt type substrate to be actually executed in the component mounting apparatus 2J based on production data and mounting data for each type stored in the storage part 104.

Figure 3:
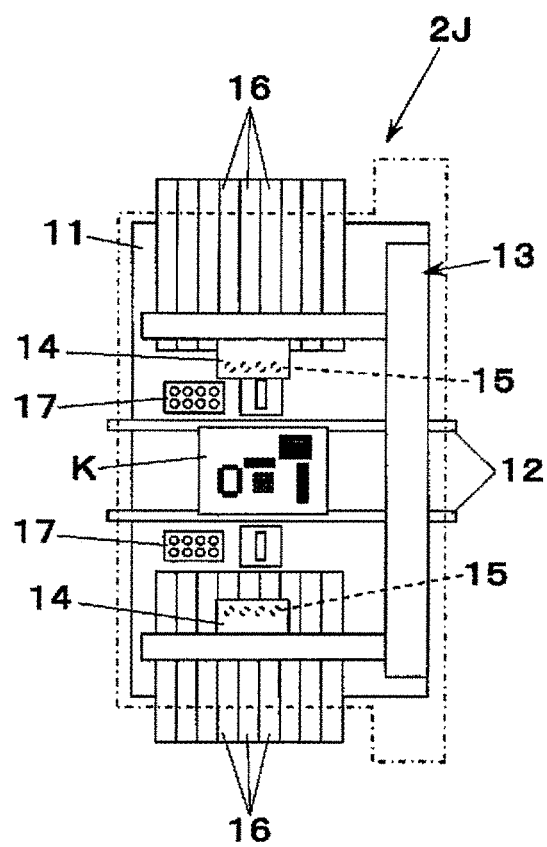
FIG. 3 is a plan view of a component mounting apparatus in the embodiment of the invention.

FIG. 3 is a plan view of the component mounting apparatus 2J in the embodiment of the invention. The component mounting apparatus 2J includes a head movement mechanism 13, mounting heads 14, suction nozzles 15, part feeders 16, and nozzle stockers 17. Each of the component mounting apparatuses 2J has a substrate conveyance path 12 for conveying a substrate K (also see FIG. 1) in the center of a base 11. After mounting components to the substrate K by the mounting heads 14 is completed, the substrate conveyance path 12 carries out the substrate K to the outside of the component mounting apparatus 2J. The base 11 is equipped with the head movement mechanism 13. The head movement mechanism 13 has the two mounting heads 14, and moves the mounting heads 14 between the part feeders 16 and the substrate K. Each of the mounting heads 14 has the plural suction nozzles 15 (pickup parts). The part feeders 16 are arranged in the base 11. The part feeder 16 is, for example, a tape feeder for supplying components to be mounted to the substrate K. Each of the mounting heads 14 sucks a component supplied by the part feeder 16 by the suction nozzle 15 and picks up the component, and mounts the component on the substrate K positioned by the substrate conveyance path 12.

The controller 3 has, for each component mounting line 2, production data of a component mounting substrate Kj (FIG. 1) of a type to be produced and equipment information for each component mounting line 2. The controller 3 manages each of the component mounting lines 2 so that each of the component mounting lines 2 constructing the component mounting system 1 produces the component mounting substrate Kj of a type scheduled to be produced. Concretely, the arithmetic control part 101 compares, for each component mounting line 2, production data of the component mounting substrate Kj of the type scheduled to be produced with equipment data of the component mounting line 2 to be used for production of the component mounting substrate Kj.

The production data is data for producing the component mounting substrate Kj, and includes, for example, size data of the substrate K, coordinate data of a component mounting position on the substrate K, data of a type and a direction of a component to be mounted on each of the component mounting positions, data of a type etc. of the suction nozzle 15 for picking up (sucking) a component from the part feeder 16, and data of a mounting program indicating mounting order of components. The equipment data of the component mounting line 2 is data of each of the component mounting apparatuses 2J constructing the component mounting line 2, and includes, for example, data of an arrangement state of the component mounting apparatuses 2J, identification data of each of the part feeders 16 furnished with each of the component mounting apparatuses 2J, data of a type and the number of components supplied by each of the part feeders 16, data of availability states of attachment places of the part feeders 16, data of a type and the number of suction nozzles 15 attached to the mounting head 14, and data of a type and the number of suction nozzles 15 placed on the nozzle stocker 17 (FIG. 3) which is a placement location of the suction nozzle 15 for replacement.

The arithmetic control part 101 decides whether or not the component mounting line 2 presently has equipment necessary to produce the substrate K by comparing production data of the component mounting substrate Kj to be produced from now with equipment data of the component mounting line 2 used for production of the component mounting substrate Kj. When the equipment is insufficient by a decision result, the arithmetic control part 101 makes the display part 102 display the contents of the insufficient equipment. In addition, the arithmetic control part 101 may make a display device (not illustrated) etc. formed on each of the component mounting apparatuses 2J display insufficient equipment information. An operator can do necessary work from the information displayed on the display device or the display part 102. For example, when a component necessary for the component mounting substrate Kj to be produced from now or the suction nozzle 15 for sucking the component is insufficient for equipment of the present component mounting line 2, the arithmetic control part 101 instructs the operator on the contents of work so as to satisfy the insufficient equipment. Accordingly, the operator performs necessary work of replacing the part feeder 16 and supplying a necessary component, or replacing a suction nozzle attached to the mounting head 14, or supplying necessary suction nozzles with the nozzle stocker 17. When the work of the operator supplements the insufficient equipment, the arithmetic control part 101 executes the mounting program read from the storage part 104, and makes the component mounting line 2 perform substrate production.

Figure 4:
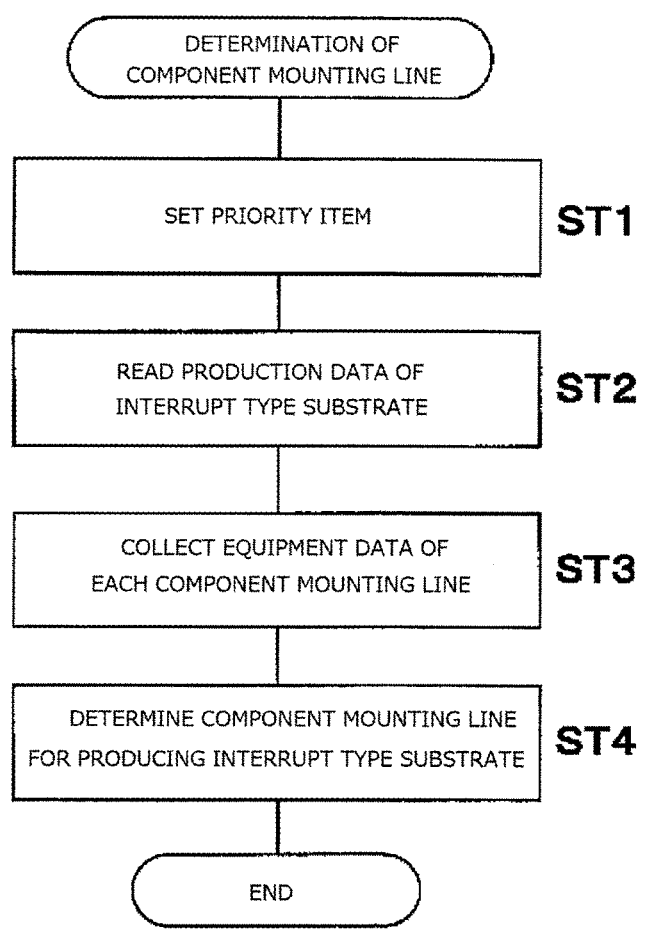
FIG. 4 is a flowchart illustrating determination processing of a component mounting line for producing an interrupt type substrate in the embodiment of the invention.
Figure 5:
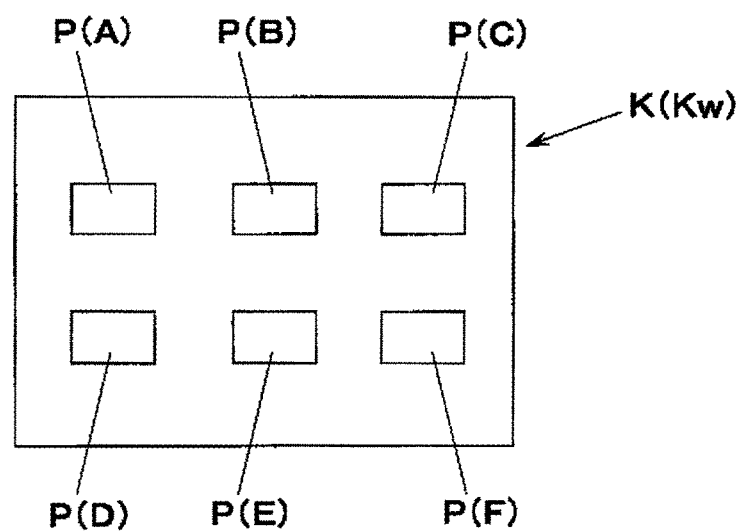
FIG. 5 is a diagram illustrating an example of the interrupt type substrate produced by the component mounting system in the embodiment of the invention.

Operation of the configuration described above will be described in further detail using FIGS. 4 to 8B. FIG. 4 is a flowchart illustrating a procedure of determination processing of the component mounting line 2 in production of an interrupt type substrate executed by the controller 3 included in the component mounting system 1 in the embodiment of the invention. FIG. 5 is a diagram illustrating an example of the interrupt type substrate produced by the component mounting system 1 in the embodiment of the invention. FIGS. 6A and 6B are diagrams illustrating types of components furnished with each of the component mounting lines 2 of the component mounting system 1 in the embodiment of the invention. FIGS. 7A and 7B and FIGS. 8A and 8B are plan views of the component mounting system 1 in the embodiment of the invention.

Here, the component mounting system 1 produces the component mounting substrate Kj as described above, but may produce, by interruption, a substrate (hereinafter called an interrupt type substrate) of a type different from a type of substrate K scheduled to be produced by each of the component mounting lines 2, for example, a trial substrate or a maintenance substrate which was produced in the past but is out of stock presently. Also, as illustrated in FIG. 5, a case where components to be mounted to the interrupt type substrate Kw include six types of components (a first type of component A, a second type of component B, a third type of component C, a fourth type of component D, a fifth type of component E, and a sixth type of component F) and there is a constraint that the sixth type of component F must be mounted at last of these six types of components will be assumed and described.

In production of the interrupt type substrate, an operator first sets a priority item in the case of determining the component mounting line 2 with respect to the controller 3 (step ST1). The operator performs, for example, a predetermined manipulation at the input part 103 and makes a selection from pre-registered items to thereby set the priority item. The component mounting line 2 to be used according to situations of the operator or equipment can be selected in the priority item. These priority items are concretely listed as described below. In addition, the priority items may be given priority to select all the items or selected a part of the items properly.

(1) The component mounting line 2 furnished with more types of components among components to be mounted on the interrupt type substrate is preferentially selected.

(2) The component mounting line 2 furnished with more components among the components to be mounted on the interrupt type substrate is preferentially selected.

(3) The component mounting line 2 furnished with space for attaching a component supply part capable of supplying components which are not furnished with any of the plural component mounting lines 2 among the components to be mounted on the interrupt type substrate is preferentially selected.

(4) The component mounting line 2 already furnished with the suction nozzle 15 capable of picking up a component which is not furnished with any of the plural component mounting lines 2 among the components to be mounted on the interrupt type substrate is preferentially selected.

(5) The component mounting line 2 capable of efficiently mounting the components in a case where mounting order of the components to be mounted on the interrupt type substrate is set is preferentially selected.

(6) Component mounting lines 2 arranged to be mutually adjacent are preferentially selected.

(7) The component mounting line 2 which has produced the interrupt type substrate in the past is preferentially selected.

In the above item (4), "the component mounting line 2 already furnished with the suction nozzle 15" means the component mounting line 2 in which the suction nozzle 15 is attached to the nozzle stocker 17 as well as the component mounting line 2 in which the suction nozzle 15 is already attached to the mounting head 14. Here, a case where priorities are assigned and set for the priority items in order described above will hereinafter be described.

After the priority item is set in step ST1, the arithmetic control part 101 reads production data of the interrupt type substrate (step ST2). The production data of this interrupt type substrate is given by, for example, the operator.

After the production data of the interrupt type substrate is read, the arithmetic control part 101 collects equipment data of each of the component mounting lines 2 (step ST3). In addition, data collected in the case of production of a normal component mounting substrate Kj can also be used in the collected equipment data of the component mounting line 2.

The arithmetic control part 101 reads the production data of the interrupt type substrate, and collects the equipment data of each of the component mounting lines 2. The arithmetic control part 101 determines the component mounting line 2 necessary to produce the interrupt type substrate based on the read production data of the interrupt type substrate and the collected equipment data of each of the component mounting lines 2 (step ST4). In addition, this determination of the component mounting line 2 includes determination of use order of the component mounting lines 2.

Figure 7A:
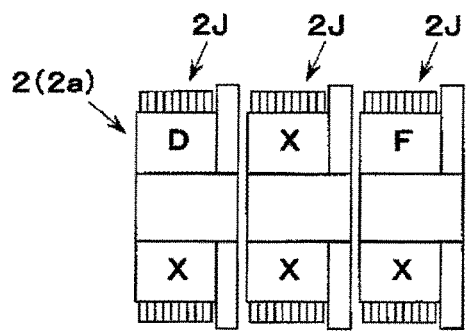
FIGS. 7A and 7B are plan views of the component mounting system in the embodiment of the invention.
Figure 7A:
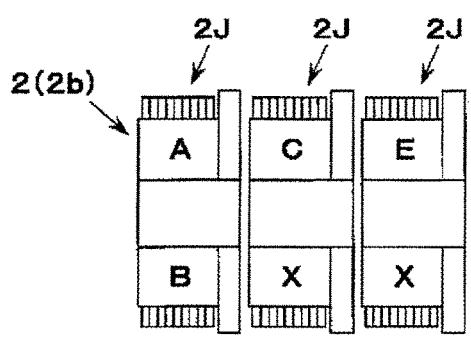
Figure 7A:
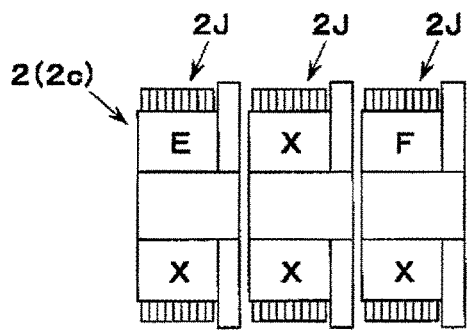
Figure 7B:
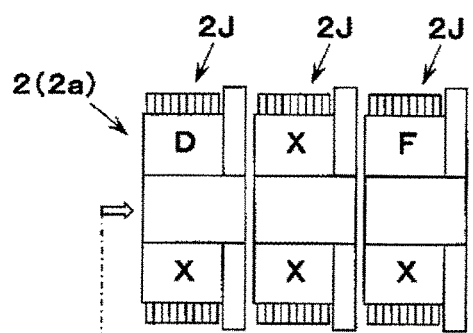
Figure 7B:
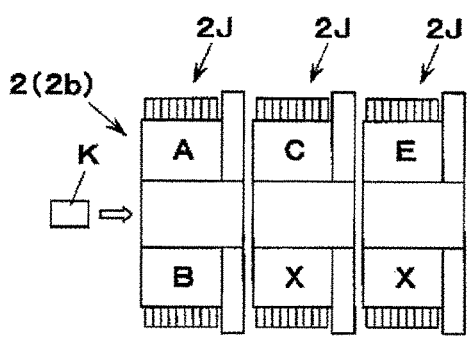
Figure 7B:
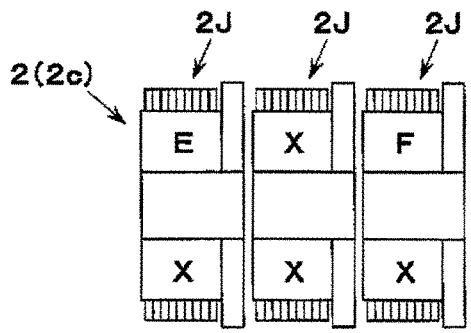

In the above step ST4, the arithmetic control part 101 determines the component mounting line 2 according to the priority item set by the operator in step ST1. It is assumed that a storage state of the components related to the interrupt type substrate Kw in equipment furnished with the three component mounting lines 2 (a first line 2a, a second line 2b and a third line 2c, see FIGS. 7A to 8B) is as follows: the first line 2a has "D and F"; the second line 2b has "A, B, C and E"; and the third line 2c has "E and F", as illustrated in FIGS. 6A and 7A. In this case, the arithmetic control part 101 first selects the second line 2b capable of mounting the components A, B, C, E, and further selects the first line 2a. Then, use order of the component mounting lines 2 is determined so that the component mounting is first performed on the substrate K in the second line 2b and then performed on this substrate K in the first line 2a (FIG. 7B). In addition, numeral "X" illustrated in FIGS. 7A and 7B indicates components other than the components A to F (the same applies in FIGS. 8A and 8B described below).

Here, the reason why the arithmetic control part 101 selects the first line 2a rather than the third line 2c as the component mounting line 2 for mounting the components after the second line 2b is because, in a situation that the components D and F must subsequently be mounted after the components are mounted in the second line 2b, both of the components D and F can be mounted in the first line 2a while only the component F can be mounted in the third line 2c. This is the result decided by the arithmetic control part 101 based on the above priority item (1) in which "the component mounting line 2 furnished with more types of components among the components to be mounted to the interrupt type substrate is preferentially selected".

Also, the reason why the arithmetic control part 101 makes a determination so that the components are first mounted in the second line 2b and then the components are mounted in the first line 2a is because there is the above-described constraint that "the sixth type of component F must be mounted at last of these six types of components A to F". The above determination is the result decided by the arithmetic control part 101 based on the above priority item (5) in which "the component mounting line 2 capable of efficiently mounting the components in the case where mounting order of the components to be mounted on the interrupt type substrate is set is preferentially selected".

Figure 8A:
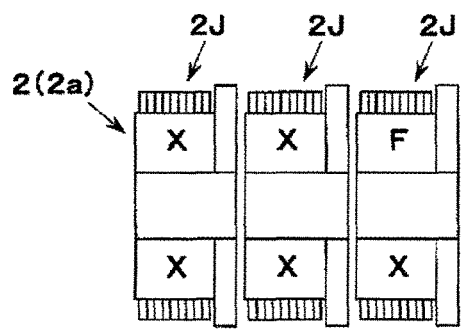
FIGS. 8A and 8B are plan views of the component mounting system in the embodiment of the invention.
Figure 8B:
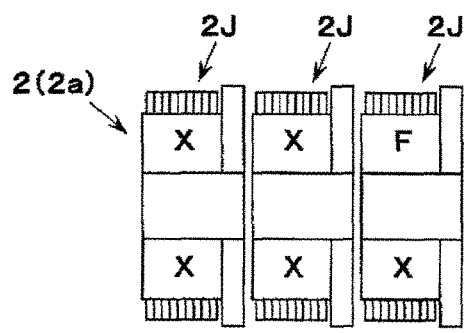
Figure 8B:
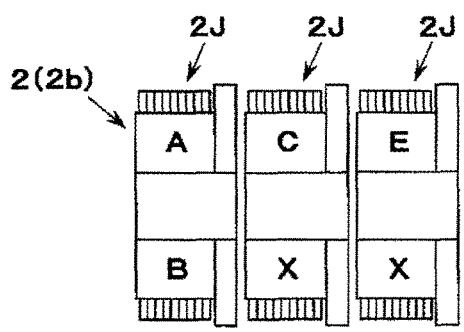
Figure 8B:
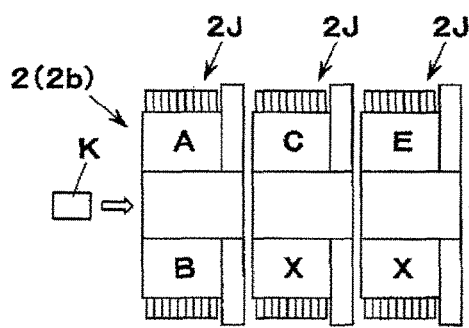
Figure 8B:
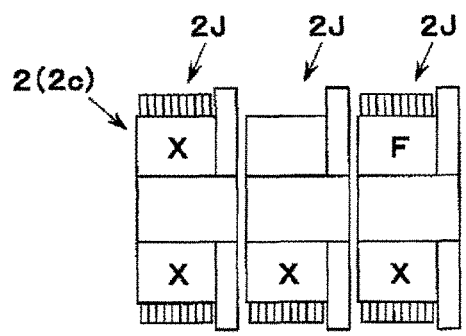
Figure 8B:
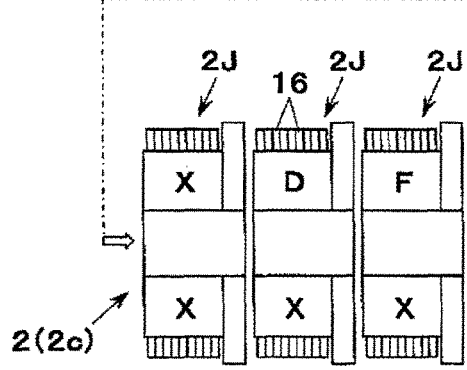

Also, in the example described above, another example in which a storage state of the components related to the interrupt type substrate Kw in equipment furnished with the three component mounting lines 2 is as follows: the first line 2a has "F"; the second line 2b has "A, B, C and E"; and the third line 2c has "F"; and the component mounting apparatus 2J (component mounting apparatus 2J located in the middle) included in the third line 2c has an available attachment place of the part feeder 16 as illustrated in FIGS. 6B and 8A is considered. In this case, the arithmetic control part 101 first selects the second line 2b capable of attaching the components A, B, C, E, and further selects the third line 2c. Then, a determination is made so that the component mounting is first performed on the substrate K in the second line 2b and then the component mounting is performed on this substrate K in the first line 2a (FIG. 8B).

Here, the arithmetic control part 101 selects the third line 2c rather than the first line 2a as the component mounting line 2 for mounting the components after the second line 2b. The component F among the components D, F which must be mounted after the components A, B, C, E are mounted in the second line 2b can be mounted in any of the first line 2a and the third line 2c. However, the first line 2a has no place for attaching the part feeder 16 for supplying the component D. Consequently, in order to supply the component D in the first line 2a, it is necessary to detach a part of the part feeders 16 other than the part feeder 16 for supplying the component F in the part feeders attached presently. In contrast, in the third line 2c, a place where the part feeder 16 can be attached is already vacant, and the part feeder 16 for supplying the component D can be attached to the place (FIG. 8B). As a result, selection of the third line 2c is more preferable than selection of the first line 2a from the standpoint of work efficiency, and the arithmetic control part 101 selects the third line 2c rather than the first line 2a. This is the result decided by the arithmetic control part 101 based on the above priority item (3) in which "the component mounting line 2 furnished with space for attaching a component supply part capable of supplying the components (component D herein) which are not furnished with any of the plural component mounting lines 2 among the components to be mounted on the interrupt type substrate is preferentially selected".

Also, the reason why the arithmetic control part 101 makes a determination so that the component mounting is first performed in the second line 2b and then performed in the third line 2c is because a requirement that "the sixth type of component F must be mounted at last of these six types of components A to F" is satisfied, and this is similar to the case of the example described above.

As described above, the arithmetic control part 101 selects the component mounting line 2 for production of the interrupt type substrate Kw so as to maintain the present equipment furnished with each of the component mounting lines 2 less changed. As a result, the operator performs less work for production of the interrupt type substrate Kw, and work efficiency is high. Also, when each of the component mounting lines 2 is returned to production of the primary component mounting substrate Kj, less work is required for the return and also in this respect, the work efficiency is high.

As described above, the production management method of the substrate K in the component mounting system 1 in the embodiment determines the component mounting line 2 necessary to produce the interrupt type substrate Kw based on the read production data of the interrupt type substrate Kw and the collected equipment data of each of the component mounting lines 2. Consequently, the interrupt type substrate Kw can be produced with the present state of the equipment furnished with the component mounting line 2 less changed.

The description has been made above based on the embodiment of the invention. This embodiment is illustrative, and it will be apparent to those skilled in the art that combinations of each of their components can have various modified examples and also these modified examples are within the scope of the invention. For example, when plural production data of the interrupt type substrates Kw can be created, an effect that the plural production data are created may be displayed on the display part 102 and an operator may select the data from among the plural production data. Or, the priority item may be reset to determine the production data of the interrupt type substrate Kw.

A production management method of a substrate in a component mounting system capable of producing an interrupt type substrate with the present state of equipment furnished with a component mounting line less changed can be provided.

What is claimed is:

1. A production management method for a component mounting system, the component mounting system comprising: a plurality of component mounting lines and a controller in communication with each of the plurality of component mounting lines, each component mounting line including a plurality of component mounting apparatuses, the production management method comprising:
   the controller managing the plurality of component mounting lines scheduled to mount components on at least one component mounting substrate, wherein the managing the plurality of component mounting lines comprises: comparing production data for the scheduled component mounting substrate with equipment data of the component mounting line; and
   when an interrupt type substrate is desired for production, the interrupt type substrate being a different type than the at least one scheduled component mounting substrate, the controller:
      reading production data of the interrupt type substrate wherein the production data has been input into the controller;
      collecting the equipment data of each of the plurality of component mounting lines; and
      determining at least one of the plurality of component mounting lines for production using the interrupt type substrate based on the read production data of the interrupt type substrate and the collected equipment data of each of the component mounting lines; and
      creating new production data for the interrupt type substrate based on the determined component mounting line; and
   wherein the determined component mounting line mounts at least one component on the interrupt type substrate.

2. The production management method for the component mounting system according to claim 1, wherein the at least one component mounting line is further determined according to a predetermined priority.

3. The production management method for the component mounting system according to claim 2, wherein the predetermined priority includes selecting a component mounting line furnished with the most types of components needed for the interrupt type substrate.

4. The production management method for the component mounting system according to claim 2, wherein the predetermined priority includes selecting a component mounting line furnished with a greater number of components needed for the interrupt type substrate.

5. The production management method for the component mounting system according to claim 2, wherein the predetermined priority includes selecting a component mounting line furnished with space for attaching a component supply unit.

6. The production management method for the component mounting system according to claim 2, wherein the predetermined priority includes selecting a component mounting line already furnished with a pickup part capable of picking up a component to be mounted on the interrupt type substrate.

7. The production management method for the component mounting system according to claim 2, wherein the predetermined priority includes selecting a component mounting line capable of efficiently mounting components in a case where mounting order of components to be mounted on the interrupt type substrate is set.

8. The production management method for the component mounting system according to claim 2, wherein the predetermined priority includes selecting adjacent component mounting when plural component mounting lines are needed.

9. The production management method for the component mounting system according to claim 2, wherein the predetermined priority includes selecting a component mounting line which has mounted components on the interrupt type substrate in the past.

10. The production management method for the component mounting system according to claim 1, wherein the production data that has been input into the controller includes:
  size data of the component mounting substrate;
  coordinate data of a component mounting position on the component mounting substrate;
  data of a type and a direction of a component to be mounted on each of the component mounting positions;
  data of a type of the suction nozzle for picking up a component from a part feeder; and/or
  data of a mounting program indicating mounting order of components.

11. The production management method for the component mounting system according to claim 2,
  determining the component mounting line includes determination of use order of the component mounting lines when multiple component mounting lines are needed for the interrupt type substrate.

12. The production management method for the component mounting system according to claim 1,
  wherein determining the at least one of the component mounting lines for the interrupt type substrate includes determining a use order in which the component mounting lines mount components on the interrupt type substrate when multiple component mounting lines are needed for the interrupt type substrate.

13. The production management method for the component mounting system according to claim 1,
  wherein, the interrupt type substrate can be a trial substrate or a maintenance substrate.

14. The production management method for the component mounting system of claim 1, wherein at least one of the plurality of component mounting apparatuses includes at least one mounting head and at least one suction nozzle.

15. The production management method for the component mounting system of claim 1, wherein the equipment data includes:
  arrangement data for the plurality of component mounting apparatuses;
  identification data for one or more part feeders furnished with the plurality of component mounting apparatuses;
  a type and number of components supplied by the one or more part feeders;
  availability of attachment places of the one or more part feeders;
  a type and number of suction nozzles attached to a mounting head of at least one of the component mounting apparatuses; and/or
  a type and number of suction nozzles placed on a nozzle stocker of at least one of the component mounting apparatuses.

* * * * *